March 24, 1936.  J. R. HUGHES  2,034,759
VEHICLE BODY
Filed July 10, 1933   3 Sheets-Sheet 1
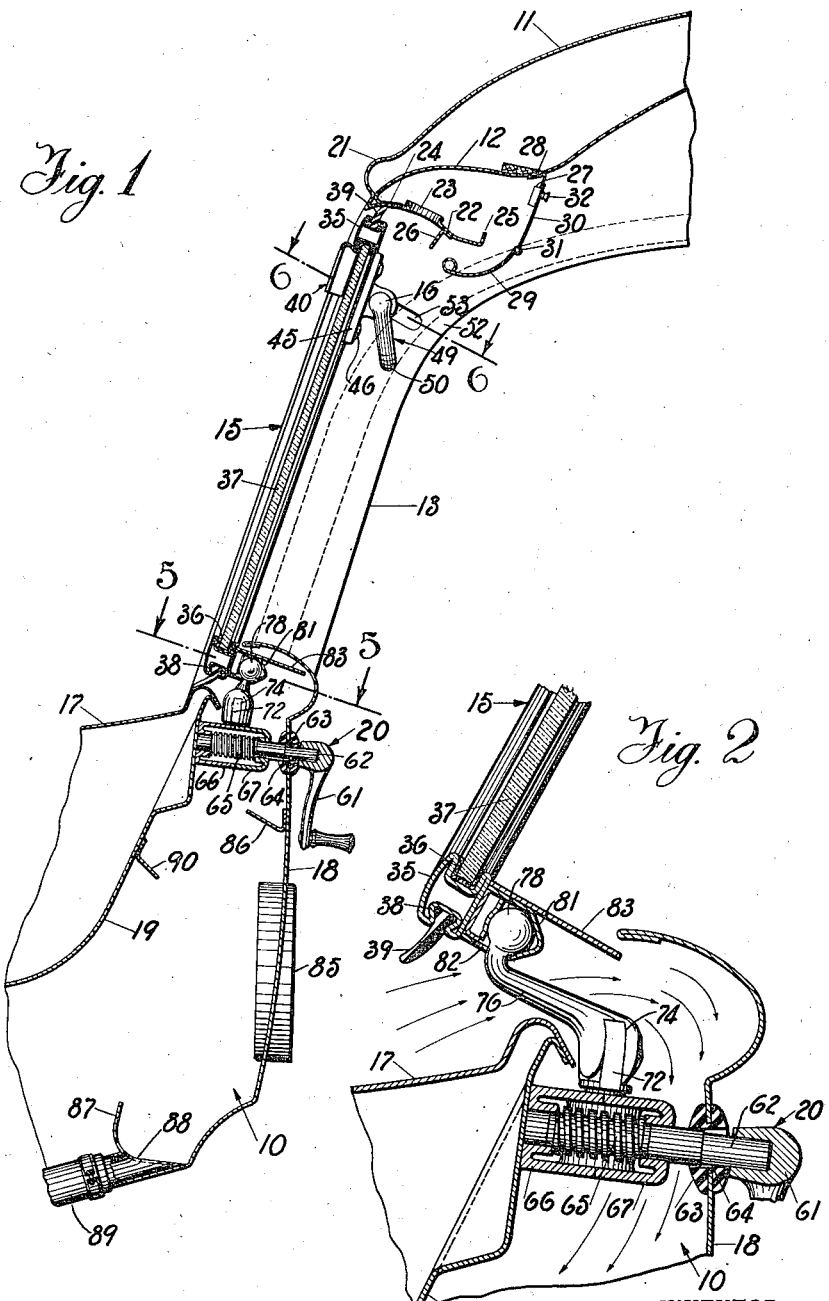

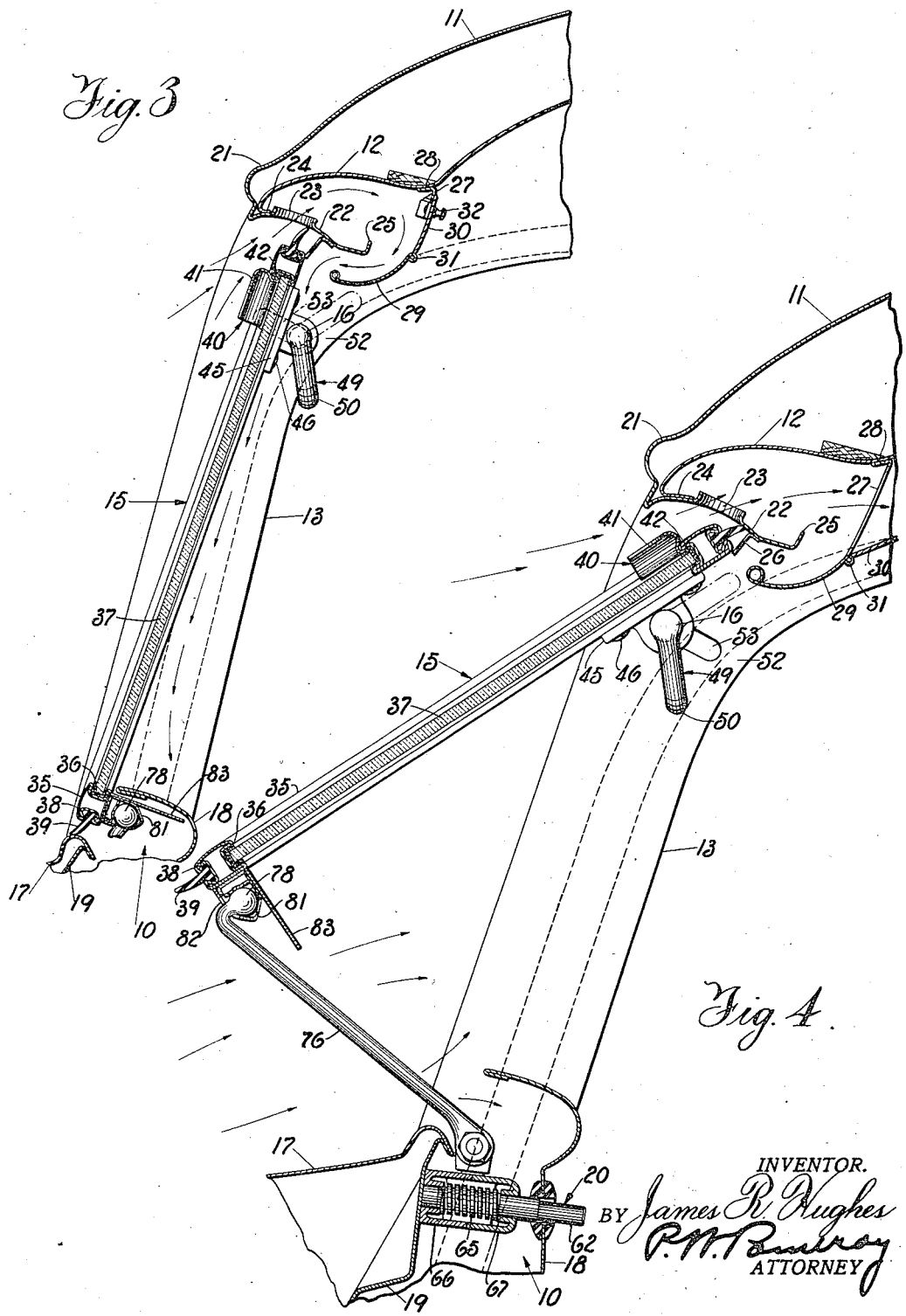

March 24, 1936.   J. R. HUGHES   2,034,759
VEHICLE BODY
Filed July 10, 1933   3 Sheets-Sheet 3
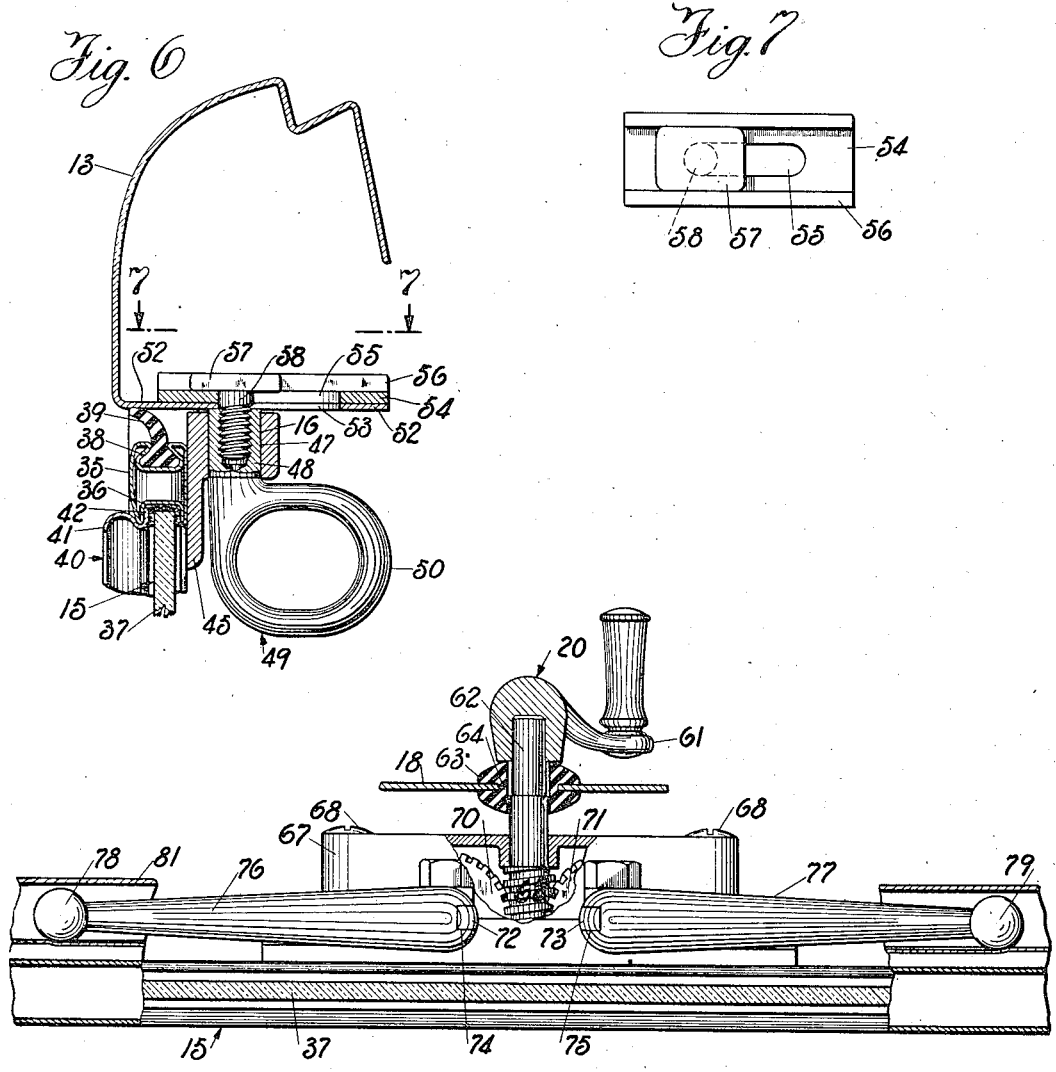
INVENTOR.
James R. Hughes
BY
ATTORNEY Patented Mar. 24, 1936

2,034,759

UNITED STATES PATENT OFFICE 2,034,759

VEHICLE BODY

James R. Hughes, South Bend, Ind., assignor to The Studebaker Corporation, South Bend, Ind., a corporation of Delaware Application July 10, 1933, Serial No. 679,611

10 Claims. (Cl. 296—94)

This invention relates to bodies of the closed type for automotive vehicles, and particularly to the means for ventilating such bodies.

The principal object of my invention is to provide a closed automotive vehicle body with ventilating devices which, in combination with the windshield therefor, provide a construction whereby air may be introduced into the body above the top of the windshield, below the bottom of the windshield, or above and below the windshield, in accordance with the desire of the occupants of the vehicle.

Another object is to provide a windshield which may be adjusted to a variety of positions to effect different conditions of ventilation in the vehicle body.

Another object is to provide a vehicle body so constructed that when the bottom of the windshield is swung outwardly from its normal closed position, air may enter the vehicle body forwardly of the instrument board and rearwardly of the cowl baffle, and any water which may enter with the air will be collected within the body and drained to a point outside of the body.

Another object is to provide a vehicle body equipped with an instrument panel and cowl baffle, each of which are provided with reinforcing members, one acting as a baffle, and the other as a rain trough for collecting and draining to a point outside of the body any rain which may come in contact therewith.

A still further object is to provide a vehicle body with a ventilator in the top thereof adapted to permit air to enter the body above the top of the windshield when the top of the latter is moved inwardly from its normal closed position, together with means whereby any rain attempting to enter the body of the vehicle with the air will be collected in a trough formed in the vehicle top header bar and drained to a point outside of the vehicle body.

Another object is to provide a ventilator in the vehicle top, which with the windshield will permit air to be directed downwardly along the rear of the windshield to prevent frosting of the windshield glass in cold weather.

A further object is to provide a windshield so mounted within the vehicle body that when the bottom of the windshield is swung outwardly to full ventilating position, the top of the windshield will be swung inwardly from its normal position to permit air to enter the body through the ventilator formed in the vehicle top.

Other objects, and objects relating to details of construction and methods of manufacture will be apparent during the course of the following description.

The accompanying drawings illustrate an acceptable mechanical embodiment of the idea of the invention. The drawings, however, are to be taken as illustrative only and not as limiting the invention, the scope of which is to be measured entirely by the scope of the sub-joined claims.

In the drawings,

Fig. 1 is a fragmentary sectional view taken longitudinally of a closed type of automotive vehicle body, illustrating the windshield in its normal closed position with its relation to the top header bar and the vehicle cowl.

Fig. 2 is a fragmentary sectional view on an enlarged scale, similar to Fig. 1, illustrating the bottom of the windshield opened sufficiently to permit the air to enter the vehicle body forwardly of the instrument board and rearwardly of the cowl baffle, but not permitting the air to enter the vehicle body above the instrument board.

Fig. 3 is a sectional view similar to Fig. 1, illustrating the top of the windshield moved rearwardly to ventilating position whereby the air will be directed downwardly along the inside of the windshield within the vehicle body.

Fig. 4 is a sectional view similar to Fig. 1, illustrating the windshield in full ventilating position whereby air is permitted to enter the vehicle body directly below the windshield and above the instrument board and also above the windshield through the ventilator formed in the top header bar.

Fig. 5 is a sectional view taken on the line 5—5 of Fig. 1, illustrating the mechanical means for operating the windshield to swing the lower portion thereof to ventilating and closed positions.

Fig. 6 is a fragmentary sectional view taken on the line 6—6 of Fig. 1, illustrating the means employed for pivotally attaching the windshield to the vehicle body.

Fig. 7 is a detail view looking in the direction of the arrows 7—7 of Fig. 6, illustrating one of the slotted channel members carried by the vehicle vody, and a bolt head adapted to slide therein for supporting the windshield.

I am aware that automotive vehicle bodies of the closed type have been provided with windshields pivotally supported by the body and adapted to be swung to an open or ventilating position to permit air to enter the body for ventilating purposes, but such ventilating systems were inadequate for proper ventilation in all climatic conditions and so far as I am aware, no one has heretofore provided a ventilating system for closed automotive vehicle bodies which would permit of adequate ventilation in hot weather and which would also permit of directing a current of air down along the inside of the windshield in cold weather to prevent frosting up of the windshield and at the same time prevent draft within the vehicle body and discomfort to the occupants thereof.

The defects and disadvantages of the ventilating construction heretofore used have been overcome by my present invention in which I have provided a vehicle body and windshield construction which will permit the occupants of the vehicle to choose and control the amount of ventilation in a variety of different ways; for example, if the vehicle is being driven in hot stormy weather and the occupant desires ventilation, the windshield can be moved to the position shown in Fig. 2, so that the air will flow into the vehicle in a path downwardly in front of the instrument board and any rain that is carried past the windshield will be caught in the trough formed on the front of the instrument panel and then drained to a point outside of the vehicle. If a greater amount of ventilation is desired or required, the windshield can be moved to the position shown in Fig. 4, so that the air will not only flow past the bottom of the windshield above the instrument board but free circulation can be had at the top of the body by opening the ventilator provided in the header bar, whereby the air will be directed into the vehicle both above and below the windshield.

If ventilation is required in cold weather or if the windshield becomes covered with frost, the operator can tilt the top of the windshield rearwardly to the position shown in Fig. 3, so that the air will flow through the passageway in the vehicle top and then be deflected downwardly along the inside of the windshield to defrost the same and permit clear vision for safe driving, but not permit currents of air to be directed against the occupant of the vehicle.

Referring to the drawings in detail, the number 10 generally indicates a vehicle body comprising a top 11 having a header bar 12 extending transversely at the front thereof, windshield pillars 13, a windshield 15 pivotally mounted at 16 on the pillars 13, a cowl 17, an instrument board 18, a cowl baffle 19, and a mechanical control 20 for swinging the lower portion of the windshield 15 outwardly on its pivots 16.

The forward portion of the top 11 is preferably formed of sheet metal and is provided with a water shed 21 beneath which the metal is bent transversely to form an arcuate-shaped finishing member 22, having spaced openings 23 therein for a purpose to be hereinafter described. A header bar 12 in the top 11 is preferably provided with a flange 24 to which the finishing member 22 is attached by any suitable means, such as spot-welding. The inner free edge of the finishing member 22 is preferably bent upwardly at 25 to form a trough to collect any water which may enter the top through the opening 23. An angle member 26 secured by spot-welding, or other suitable means, to the under exposed face of the finishing member 22 preferably extends from one windshield pillar 13 to the pillar on the opposite side of the vehicle to form a stop for the upper edge of the windshield 15 for a purpose to be more fully described hereafter. A trim member 27 also forming an air deflecting baffle is secured to the header bar 12 at 28 in any suitable manner, such as by spot-welding. The trim member 27 is preferably curved outwardly at 29 in spaced relation to the finishing member 22 as is clearly indicated in Figs. 1 and 3. The trim member 27 is also provided with one or more doors 30 hinged thereto at 31 and held in closed position by the latch 32 as illustrated in Figs. 1 and 3.

Referring to Fig. 3, it will be observed that any air which enters the vehicle body through the opening 23 formed in the finishing member 22 will be directed beneath the header bar 12 around the flange 25 formed on the finishing member 22 and then directed forwardly against the windshield 15 because of the forwardly extending curved portion 29 formed on the trim member 27. If it is desired to direct air into the vehicle more directly, the door 30 may be opened as shown in Fig. 4 so that any air entering the vehicle through the openings 23 formed in the finishing member 22 will be directed beneath the vehicle top 11 directly into the body.

The windshield 15 comprises a formed sheet metal frame 35 provided with a channel 36 therein in which is inserted the glass 37. The frame 35 is also provided with a channel 38 in the outer faces thereof in which is inserted a flexible weather strip 39 adapted to contact with the windshield pillars 13, the finishing member 22 forming a part of the top structure, and the cowl 17. To prevent rain from traveling upwardly along the windshield glass 37 and into the body through the opening 23 formed in the finishing member 22, I preferably provide a baffle 40 having a depending portion 41 spaced from the windshield glass 37 and an upwardly extending flange 42 secured in the channel 36 of the windshield frame 35, as is clearly illustrated in Figs. 3 and 4.

A pivot 16 for the windshield 15 is illustrated in Figs. 1, 3, 4 and 6 in which I have shown brackets 45 secured in any suitable manner as, for example, by rivets 46 to the windshield frame 35. While I have illustrated only one of the pivots for the windshield, it will be evident that there is such a pivot at each side of the windshield and as the constructions are identical, except that they are reversed in position, I have illustrated and will describe only one of the same.

The bracket 45 is provided with an opening 47 in which is inserted the journaled end 48 of the locking and adjusting member 49 which is provided with a suitable operating handle 50. The windshield pillar 13 is formed with a flange 52 having a slot 53 therein, as is clearly illustrated in Fig. 6. A reinforcing member 54 provided with a slot 55 therein, corresponding with the slot 53, is secured by any suitable means such as spot-welding to the inner face of the flange 52 forming a part of the windshield pillar 13. The reinforcing member 54 is formed to provide a channel 56 in which is slidably received the head 57 of the bolt 58 which is screw-threaded into the journaled end 60 of the locking and adjusting member 49.

It will be apparent from an inspection of Fig. 6 that when the locking and adjusting member 49 is rotated in a clockwise direction, that the bolt 58 will be threaded into the journaled end 48 thereof so that the end face of the journaled end 48 of the locking member 49 will bear against the exposed face of the flange 52 and the head 57 of the bolt 58 will clamp against the inner face of the reinforcing member 54 to thereby clamp or secure the windshield in position relative to the body and against vibration and rattle. Because of the slot 53 formed in the flange 52 and the corresponding slot 55 formed in the reinforcing member 54, upon unscrewing or loosening the locking member 49, the top portion of the windshield may be adjusted to several positions as, for example, the position shown in Fig. 1, in which the windshield has been moved to the forward end of the slot so that there is a seal between the weather strip 39 and the finishing member 22 forwardly of the opening 23 therein to prevent air from entering the vehicle body beneath the header bar 12 formed in the top 11.

Also, the windshield may be adjusted to the position shown in Fig. 3 in which the locking member 49 has been moved to the rear of the slots 53 and 55 formed respectively in the flange 52 and reinforcing member 54, so that air is permitted to enter the vehicle body through the openings 23 formed in the finishing member 22 and in which the air may be directed into the vehicle body along the rear face of the windshield 15, or the air may be directed into the vehicle body beneath the top through the doors 30 formed in the trim member 27 forming a part of the top structure. It is, of course, evident that the upper portion of the windshield can be adjusted to any position intermediate the position shown in Figs. 1 and 3 so that the occupants of the vehicle can regulate at will the amount of air which will be directed into the vehicle below the header bar 12 forming a part of the top structure.

After the windshield is assembled in the vehicle body the locking member 49 is permitted to have only limited rotation which is sufficient to permit swinging of the windshield on the journal 48 and then to clamp the locking member 49 to prevent swinging of the windshield. As illustrated, when the handle 50 of the locking member 49 is moved to the dotted position shown in Figs. 3 and 4, the locking member 49 will be unclamped to permit swinging of the windshield, and when the handle 50 is moved to the full line position shown in the respective Figs. 3 and 4, the clamping member 49 with the screw 58 will clamp the windshield against movement in the slots 53 and 55.

Although I have illustrated and will describe an acceptable form of mechanical regulator for the lower portion of the windshield, my invention is not limited to the specific structure shown as any suitable form of regulator may be substituted for that illustrated without departing from the objects and function of my invention.

Referring particularly to Figs. 2 and 5, the mechanical control 20 for the windshield 15 comprises a regulating handle 61 secured to the shaft 62 which extends through a grommet 63 secured in an opening 64 formed in the instrument board 18. The shaft 62 is provided with a worm 65 received in a casing formed of the two parts 66 and 67 secured to the cowl baffle 19 by the screws 68. The casing members 66 and 67 are formed to provide bearings for the shaft 62 at the ends opposite the worm portion 65, as illustrated in Fig. 2. The worm 65 formed on the shaft 62 engages with the worm gears 70 and 71 mounted on shafts journaled in the casing members 66 and 67, which shafts terminate in flattened end portions 72 and 73 received in the slotted ends 74 and 75 of the lever arms 76 and 77, the free end of each lever arm 76 and 77 terminating in a ball 78 and 79, respectively. Secured to the inner face of the windshield frame 35 is a trough-shaped stamping 81 adapted to receive the ball portions 78 and 79 formed on the free ends of the lever arms 76 and 77, the neck portion of said lever arms extending through a slot 82 formed in the stamping 81. Above and adjacent to the member 81 is a baffle 83 adapted to be secured to the windshield plane 35 in any suitable manner and for a purpose to be hereinafter described.

Various instruments which, for example, may be a clock, speedometer, oil gauge or other instruments, all of which are well known to those skilled in the art, are mounted on the instrument board 18, as is indicated generally by the numeral 85 on Fig. 1.

It is desirable to protect such instruments against rain and moisture which may enter the vehicle body with the air directed forwardly of the instrument board and I, therefore, provide a baffle forming a trough 86 above such instruments which is secured to the instrument board 18 by any suitable means, as illustrated in Fig. 1. The lower end of the instrument board 18 is preferably provided with an upturned flange 87 to form a water-receiving trough 88 to which is connected a pipe 89 for directing the water collected in the trough 88 outside of the vehicle body. To assist in directing the water entering the vehicle body forwardly of the instrument board 18 into the trough 88, I also provide a baffle 90 secured in any suitable manner on the rear face of the cowl baffle 19.

Having now described in detail the various parts forming the body structure, the windshield mounted between the windshield pillars and the manual control for the windshield, I will describe the operation and function of my invention.

Referring to Fig. 1 in which the windshield is illustrated in normal closed position, it will be observed that air is not permitted to enter the vehicle body, neither above nor below the windshield and that the windshield in that position functions in substantially the same manner as though it were rigidly secured in the front of the vehicle body. When, however, it is desired to admit a limited amount of air into the vehicle body, the operating handle 61 of the mechanical control 20 may be rotated whereupon the worm 65 on the shaft 62 will cause the worm gears 70 and 71 to move the ball ends 78 and 79 of the lever arms 66 and 67 outwardly to swing the lower portion of the windshield in the position as shown in Fig. 2. When in this position, air is permitted to enter the vehicle body in the direction of the arrows indicated in Fig. 2, that is, rearwardly of the cowl baffle 19 and forwardly of the instrument board 18. When in this position, air is prevented from entering the vehicle body beneath the windshield and above the instrument board 18 because of the baffle 83, the free edge of which extends beneath the forward edge of the instrument board.

Upon further rotation of the operating handle 61, the windshield may be swung forwardly to a full ventilating position and the air will be permitted to enter the vehicle body in a direct path, that is, beneath the lower edge of the windshield and above the instrument board 18 as is clearly indicated in Fig. 4.

If in cold or stormy weather it is desired to ventilate the vehicle body at the top only, the windshield may be moved to the position in Fig. 3 by moving the pivot 16 to the rear of the slots 53 and 55 formed respectively in the flange 52 of the windshield pillar 13 and the reinforcing member 54, in which position air is permitted to enter the vehicle body in the direction of the arrows indicated in Fig. 3, through the opening 23 formed in the finishing member 22, the air being deflected downwardly along the inner face of the windshield by the curved portion 29 forming a part of the trim member 27 secured to the top 11. If more direct ventilation is required, the doors 30 in the trim member 27 may be opened whereupon air will be permitted to enter the opening 23 formed in the finishing member 22 and directed beneath the vehicle top directly into the vehicle body as indicated by the arrows in Fig. 4.

As stated above, when it is desired to admit air into the vehicle body at the top of the windshield, the pivots are moved rearwardly in the slots formed in the windshield pillars and the reinforcing member therefor to the position shown in Fig. 3 in which position the top horizontal portion of the windshield frame 35 bears against the stop 26 secured to the under face of the finishing member 22.

If it is desired to move the windshield to full ventilating position, from the position illustrated in Fig. 3, the stop 26 will form with the windshield frame 35 a pivot for the windshield 15.

It will also be observed that I have provided suitable means for preventing rain from entering the vehicle body when the windshield is in any of the suggested positions except when the windshield is in full ventilating position, as shown in Fig. 4, and even in that case rain is prevented from entering the vehicle at the top of the windshield, first, because of the baffle 40 at the top of the windshield glass which prevents rain that travels up the glass from going through the opening 23 formed in the finishing member 22 and, second, because of the trough formed in the finishing member 22, and as a further safety measure, by the curved forwardly extending portion 29 forming a part of the finishing member 27.

Although I have not shown a discharge for the water from the top, the same may be carried to a point outside of the vehicle body by any suitable means.

Rain is prevented from entering the vehicle body when the lower portion of the windshield is opened to ventilating position to the extent shown in Fig. 2, because any rain which enters with the air will either be caught in the trough 86 secured to the forward face of the instrument board 18 above the instruments mounted thereon, or will be directed by the baffle 90 secured on the rear face of the cowl baffle 19 into the trough 88 at the lower end of the instrument board 18 whereupon it will be discharged through the pipe 89 outside of the vehicle body.

It will be apparent that in warm weather driving, the windshield can be adjusted from fully closed position to a position which will admit only a limited amount of air into the vehicle body forwardly of the instrument board and that the windshield can be swung open further until full ventilation is provided, in which position air is not only directed directly into the vehicle body above the instrument board but air is also directed into the body directly beneath the vehicle top.

In cold weather driving, it is not desirable to admit any air into the vehicle body around the driver's feet and, therefore, the bottom portion of the windshield should be maintained in fully closed position but as it is desirable to provide means to prevent the frosting up of the inside of the windshield glass, the upper portion of the windshield may be swung inwardly to admit a limited amount of air to be directed downwardly along the inside face of the windshield glass through openings provided in the vehicle top immediately above the windshield.

Having now described the construction of my invention in detail and the objects and operation thereof, it is to be understood that the invention is not to be limited to specific structures shown and described but that suitable changes may be made therein both as to details of construction and methods of manufacture without departing from the spirit and scope of my invention and that the invention is to be limited only to the appended claims.

What I claim is:

1. The combination of a vehicle body having a windshield pivoted thereto and an instrument board, means in said body above said windshield to direct air downwardly along the inner face of said windshield when in one adjusted pivoted position, and means to direct air into said body forwardly of said instrument board when said windshield is in another pivoted position.

2. The combination of a vehicle body having a windshield pivoted thereto and an instrument board, means in said body above said windshield to direct air downwardly along the inner face of said windshield when in one pivoted position, and means to permit air to directly enter said body above said instrument board and beneath said windshield when said windshield is swung from the same pivoted position.

3. The combination of a vehicle body having a windshield pivoted thereto and a top, a header bar forming a part of said top, a finishing member having openings therein beneath said header bar, and a trim member spaced from said finishing member whereby when said windshield is in one pivoted position air will be directed through the opening in said finishing member and deflected by said trim member along the inner face of said windshield.

4. In combination with a vehicle body having a top provided with a header bar, a finishing member, and a trim member, of means in said finishing member to permit air to enter said body beneath said header bar, a windshield movable to a variety of positions, and means forming a part of said finishing member for directing air along the inner face of said windshield when in one selected position.

5. In combination with a vehicle body having a windshield pivoted thereto and a top provided with a header bar, a finishing member and a trim member, of means in said finishing member to permit air to enter said vehicle body when said windshield is in one of its adjusted positions, and means in said trim member to selectively direct the air along the inner face of said windshield or to permit the air to enter said body directly beneath said top.

6. In combination with a vehicle body having a one-piece windshield pivoted thereto, a top for said body, an opening in said top, and an opening in said body, of means for moving the windshield to a plurality of positions whereby air is directed to the body either through the top opening, through the body opening, or above and below said windshield substantially as described.

7. In combination with a vehicle body having a windshield pivoted thereto and a top provided with an opening therein, of means for positioning the windshield pivots to move said windshield rearwardly of said opening to permit air to enter said body above said windshield, said pivots and windshield also being movable to a position to preclude air from entering said body through said opening.

8. The combination of a vehicle body having a one-piece windshield adapted to be pivoted thereto in a plurality of positions, a top, a cowl, an instrument board spaced from said cowl to provide an opening in said vehicle body, means extending from said windshield for directing air into said body forwardly of said instrument board when said windshield is in one of its pivoted positions, and means for directing air along the inner face of said windshield when said windshield is pivoted in its rearward position and at the same time air is directed into said body forwardly of said instrument board.

9. The combination of a vehicle body having a windshield adapted to be pivoted thereto in a plurality of positions, a top, means in said top to permit air to enter said body, and means spaced from said windshield carried by said top to direct the air along the inner face of said windshield when said windshield is moved to its rearward pivoted position.

10. In combination with a vehicle body having a one-piece windshield and a top therefor having an opening therein, pivoting means for said windshield adjacent to the top and at the bottom thereof, said top and bottom pivoting means being movable to positions to preclude air from entering said body around said windshield, to permit air entering said body beneath said windshield, to permit air to enter said body through the opening in said top and permit air to enter said body through the opening in said top and beneath said windshield.

JAMES R. HUGHES.